March 7, 1967  J. NEWALL  3,307,633
RESILIENT, ONE-PIECE SEALING MEMBER FOR ACCOMMODATING
UNEQUAL FLUID PRESSURES
ON OPPOSING SURFACES
Filed Nov. 25, 1964

INVENTOR.
JOHN NEWALL
BY
ATTORNEY

United States Patent Office 3,307,633
Patented Mar. 7, 1967

3,307,633
RESILIENT, ONE-PIECE SEALING MEMBER FOR ACCOMMODATING UNEQUAL FLUID PRESSURES ON OPPOSING SURFACES
John Newall, Salford, England, assignor to Grinnell Corporation, Providence, R.I., a corporation of Delaware
Filed Nov. 25, 1964, Ser. No. 413,828
Claims priority, application Great Britain, Nov. 25, 1963, 46,375/63
3 Claims. (Cl. 169—22)

This invention relates to sealing members for control valves used in fire fighting systems and particularly to control valves which are adapted to give alarms when the fire fighting systems come into operation.

An object of the invention is to provide a novel sealing member which is on the control valve clack and which engages the valve seat member in a member that improves the operation of the control valve and of the alarm-giving mechanisms.

According to the invention the resilient sealing member has a first annular portion with one surface in contact with a corresponding surface on the clack and has a second annular portion turned back upon the first portion from the outer edge thereof so that when the valve is closed a continuation of the one surface is in contact with a corresponding surface on the seat member. The seat member, in turn, has a second surface which is spaced from the first by an annular groove and which is engaged by a third sealing member portion when the clack is closed. In this way this groove is isolated from the pressure regions on either side of the clack.

More particularly, according to the invention there is provided a fire fighting system control valve of the kind described in which the groove referred to communicates with a passageway leading away from the seat member surfaces to the alarm device, in which the first angular sealing member portion is in the form of a flat disc, in which the second annular sealing member portion is also in the form of a flat disc, but turned back on the first to provide a U-shaped cross section, in which the outer surfaces of the legs of the U-shape engage the clack surface and the first seat member surface, respectively, and in which the third sealing member portion is in the form of a skirt extending from the sealing member at a point between the above-mentioned outer surfaces thereof, and, when the clack is closed, engaging the second seat member surface.

The clack may be hinged and normally held closed by a releasable latch.

Figure 1:
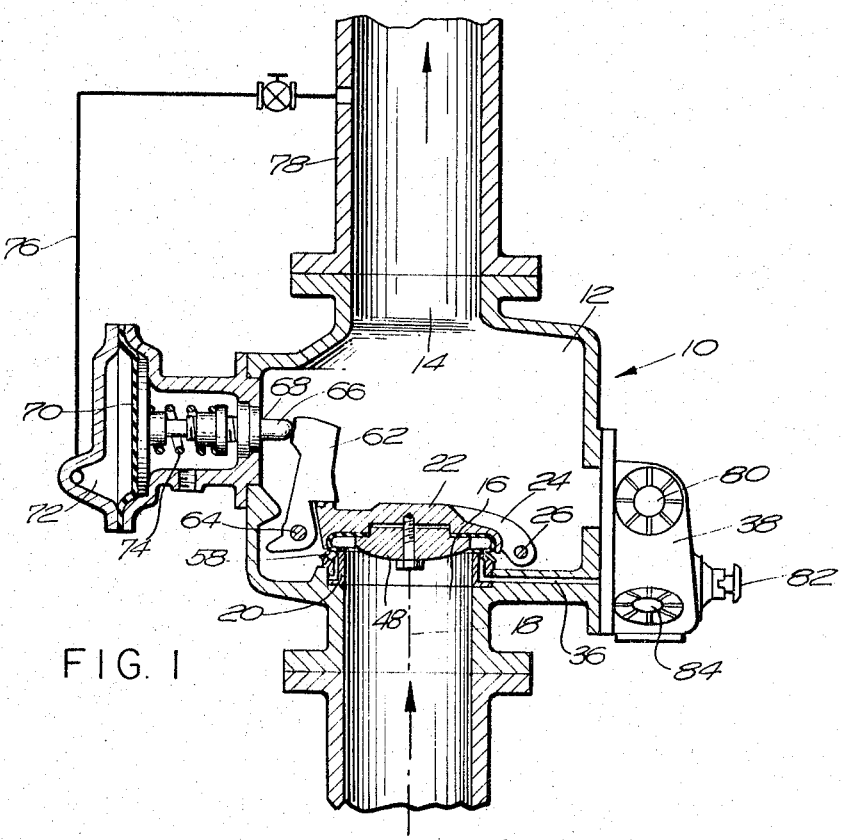
Figure 2:
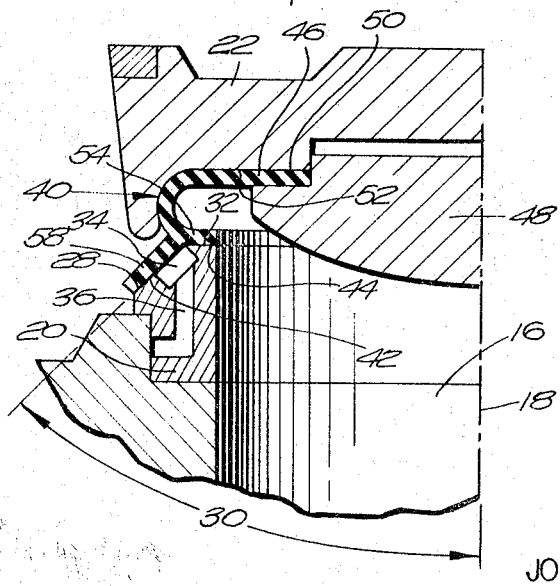

Referring to the accompanying drawing:

FIGURE 1 is a longitudinal section of a control valve in accordance with the invention, and FIGURE 2 is a fragmentary sectional view showing the sealing member in accordance with the invention.

In FIGURE 1, the control valve shown comprises a body 10 having a hollow chamber 12, an outlet opening 14 and an inlet opening 16. The latter has an axis 18 and is rebated to receive an annular seat member 20 which co-operates with a clack 22 supported on an arm 24 hinged to the body at pivot 26. The seat member 20 has a sloped outer surface 28 presented into said chamber at an angle 30 to said axis 18 and also has an inner surface 32 presented into said chamber along said axis. An annular groove 34 is located between these seat member surfaces and communicates with a passageway 36 leading to an alarm device 38 of the pelton wheel type. The groove 34 is sealed from the chamber 12 by a resilient annular sealing member 40 which is mounted on the clack 22 and has surfaces 42 and 44 engaging the seat surface portions 28 and 32, respectively, when the clack is in closed position. More particularly, this sealing member has an inner flat portion 46 sealingly secured to the clack by a clamp 48 so that its upper surface 50 is in contact with the corresponding clack surface 52. As can be seen from the more detailed view in FIGURE 2, the outer portion 54 of the sealing member turns back upon the inner portion (in the form of a U) so that a continuation 44 of the surface 50 engages the inner sealing surface 32 on annular seat member 20. Between sealing member portions 46 and 54 there is an outwardly and downwardly extending skirt 58 the under surface 42 of which engages the sloped seat member surface 28 on the outer side of the groove 34. With this shape of sealing member the sealing pressure between surfaces 32 and 44 is that of the water supply pressure in inlet opening 16, whereas the sealing pressure between surfaces 28 and 42 is the usually-lower pressure in the outlet opening 14. Moreover the effective area of the clack (projected in a plane perpendicular to the axis 18) on which the inlet pressure acts is not significantly less than the corresponding effective area of the clack on which the outlet pressure acts. This is due to considerable extent to the slope of the skirt 58, which reduces the effective area of the outlet opening pressure. For better understanding of the valve operation the sealing member can also be considered as being formed of four portions integral with each other where they join, the first portion 46 being that clamped to the clack, the second being that having the U-shape, the third 54 being that engaging the sealing surface 32 and the fourth portion being the skirt 58 extending from the second portion.

The clack 22 is held in its closed position by a latch 62 hinged to the body 10 at pivot 64 and held in the position shown by a reciprocable pin 66 which extends into the body chamber 12 through a sliding seal opening 68 and which has its outer end connected to a diaphragm 70 forming one side of a pressure chamber 72. The diaphragm 70 is urged by a spring 74 into the pressure chamber 72 but is held in the position shown in the drawing by air pressure derived, through pipe connection 76, from the pressure in the pipe 78 connected to outlet opening 14. Pipe 78 is connected (at portions not shown) to a sprinkler system (not shown) comprising distributing pipes having located thereon in spaced relation therealong sprinkler heads which are normally sealed closed and which are opened by actuation of heat sensitive devices. The valve chamber 12, pipe 78 and sprinkler system distributing pipes are charged with air under pressure. In the event of fire, the heat sensitive devices break the seals at the sprinkler heads and release this air pressure, producing a pressure drop in chamber 72 which allows the spring 74 to move the diaphragm 70 into chamber 72 and carry pin 66 to the left releasing latch 62 and clack 22. Inlet water pressure then opens clack 22 and allows water to pass through the body outlet opening 14 and thence to the sprinkler system and also to pass via the annular groove 34 and passageway 36 to the alarm device 38.

Valve 80 on alarm device 38 is a main drive. Valve 82 is an alarm shut-off and valve 84 is provided to permit testing of the alarm.

In a deluge system in which the distributed sprinkler pipe work is open to atmosphere through open sprinkler heads, the pipe 76 leading to the chamber 72 comes not from pipe 78, but from a separate fire detecting system which maintains the required air pressure on the diaphragm until there is a fire. The operation is otherwise similar to that described above.

In a wet pipe system in which the distributed sprinkler pipe work is filled with water and the sprinklers are again sealed closed, the clack releasing mechanism would be arranged so that pin 66 is fully retracted from valve chamber 12 and that latch 62 is held back from engagement with the clack 22. The pressure of this water would keep the clack closed until a head opened. If preferred the releasing mechanism and latch could be completely removed.

In any of these types of systems the resilient nature of the seal, in accordance with the invention, is found to be of great value in making a water-tight joint, and as soon as the clack lifts owing to a sprinkler head operating, water passes into the alarm groove 34.

What we claim is:

1. For a fire fighting system a fluid controlling valve having:
   (I) a passage therethrough with an axis,
   (II) a seating member which:
      (A) extends around said passage,
      (B) has an annular groove which extends around said axis
      (C) has a first seating surface between an inner side of said groove and said axis,
      (D) has a second seating surface beyond an outer side of said groove
   (III) a clack which is movable between an open position remote from said seating member and a closed position adjacent said seating member,
   (IV) a one-piece sealing member which:
      (A) is formed of resilient material,
      (B) has a first portion which:
         (1) is adjacent said clack,
         (2) has a surface sealingly engaging said clack,
      (C) has a second portion which:
         (1) is integral with said first sealing member portion,
         (2) extends from said first sealing member portion away from said axis,
         (3) turns back toward said axis,
      (D) has a third portion which:
         (1) is integral with said second sealing member portion,
         (2) extends from said second sealing member portion toward said axis,
         (3) has a surface sealingly engaging said first seating surface of said seating member when said clack is in its said closed position,
      (E) has a fourth portion which:
         (1) is integral with said second sealing member portion,
         (2) extends from said second sealing member portion away from said axis,
         (3) has a surface sealingly engaging said second seating surface of said seating member when said clack is in its said closed position,
         (4) has an opposite surface which is spaced from said clack when said clack is in its said closed position, whereby when the clack is in its said closed position the pressure of the controlled fluid on one side of said clack holds the third sealing member portion against the first seating surface and the pressure of the controlled fluid on the other side of said clack holds the fourth sealing member portion against the second seating surface.

2. A control valve according to claim 1 wherein the first seating member surface lies in a substantially flat plane and wherein said second seating member surface lies in a substantially conical plane, whereby the effective area of the clack on which fluid pressure acts to hold the clack in its said closed position is minimized.

3. A control valve according to claim 1 wherein the said groove communicates with an alarm device.

References Cited by the Examiner
UNITED STATES PATENTS

| | | | |
|---|---|---|---|
| 1,869,204 | 7/1932 | Lowe et al. | 169—19 |
| 2,398,461 | 4/1946 | Rider | 169—19 |
| 2,586,720 | 2/1952 | Rowley | 169—19 |
| 2,597,474 | 5/1952 | Griffith | 169—19 X |
| 2,667,934 | 2/1954 | Rowley | 169—20 |

M. HENSON WOOD, JR., *Primary Examiner.*

V. C. WILKS, *Assistant Examiner.*